US007845057B2

(12) United States Patent
Hsiao

(10) Patent No.: US 7,845,057 B2
(45) Date of Patent: Dec. 7, 2010

(54) CRANK PULLER FACILITATING DISMOUNTING OF CHAINWHEEL

(75) Inventor: Chih Yuan Hsiao, Tucheng (TW)

(73) Assignee: Lifu Bicycle Co., Ltd., Taipei (TW)

( * ) Notice: Subject to any disclaimer, the term of this patent is extended or adjusted under 35 U.S.C. 154(b) by 1168 days.

(21) Appl. No.: 11/492,815

(22) Filed: Jul. 26, 2006

(65) Prior Publication Data

US 2007/0067985 A1 Mar. 29, 2007

(30) Foreign Application Priority Data

Sep. 15, 2005 (TW) .............................. 94215878 U

(51) Int. Cl.
*B23P 19/04* (2006.01)

(52) U.S. Cl. .............................. 29/255; 29/256; 29/278; 29/270

(58) Field of Classification Search ................... 29/255, 29/244, 256, 263, 260, 278, 270, 271, 280, 29/282
See application file for complete search history.

(56) References Cited

U.S. PATENT DOCUMENTS

| | | | | |
|---|---|---|---|---|
| 3,862,483 | A * | 1/1975 | Kloster | 29/257 |
| 5,090,102 | A * | 2/1992 | Lovell | 29/255 |
| 5,890,271 | A * | 4/1999 | Bromley et al. | 29/263 |
| 6,125,519 | A * | 10/2000 | Kaibach et al. | 29/275 |
| 7,496,999 | B2 * | 3/2009 | Robarge | 29/265 |
| 7,644,481 | B2 * | 1/2010 | Kang | 29/271 |
| 7,658,368 | B2 * | 2/2010 | Laun | 254/18 |
| 2007/0067985 | A1 * | 3/2007 | Hsiao | 29/700 |

* cited by examiner

*Primary Examiner*—Lee D Wilson
(74) *Attorney, Agent, or Firm*—Rabin & Berdo, P.C.

(57) ABSTRACT

A crank puller includes a nut portion having a front end for screwing into a threaded hole on a crank, and an internally threaded bore; a bolt portion screwed through the threaded bore and having a front conical-bottomed hole; a head portion fitted in the conical-bottomed hole and having a front end with an annular groove for receiving an elastic element therein; and a cap portion assembled around the front end of the head portion for pressing against a crank axle, and being replaceable corresponding to a diametrical size of the crank axle.

6 Claims, 6 Drawing Sheets

CRANK PULLER FACILITATING DISMOUNTING OF CHAINWHEEL

FIELD OF THE INVENTION

The present invention relates to a crank puller facilitating dismounting of chainwheel, and more particularly to a crank puller having a head portion with a cap portion assembled thereto for pressing against a crank axle while the cap portion is replaceable to meet a diametrical size of the crank axle. The head portion has a front end formed with an annular groove for receiving an elastic element therein. The elastic element elastically presses against an inner side of the cap portion to prevent the cap portion from easily separating from the head portion. A steel spring plate is clamped around a neck section of the head portion, and a ball is disposed in a conical-bottom hole formed at a front end of a bolt portion of the crank puller, preventing a rear end of the head portion from directly contacting with the conical-bottomed hole to cause wearing of the head portion and the bolt portion during rotation thereof.

BACKGROUND OF THE INVENTION

Generally, a crank for driving a chainwheel to rotate is separable from the chainwheel using a tool, so that the separated crank and chainwheel can be maintained or repaired. The tool is referred to as a crank puller. To use the crank puller, first use a hex wrench to loosen a crank bolt from an internally threaded hole on the crank, and then screw a front end of the crank puller into the threaded hole to enable separation of the crank from a crank axle, which supports the crank and is associated with the chainwheel.

Most of the commercially available crank pullers are of a fixed type. That is, the crank puller has a front socket with a fixed size to meet the size of the crank axle. There are two different sizes available for the front socket on the crank puller. One of the two front socket sizes has a larger outer diameter about 16 to 17 mm, and the other one has a smaller outer diameter about 10.5 mm, so that crank pullers with differently sized front sockets can be used to separate cranks with differently sized crank axles.

There is also a replaceable type crank puller with a replaceable front socket. Differently sized front sockets can be detachably fitted to the front end of the crank puller for use in separating cranks with differently sized crank axles, so that the crank puller has a wider range of application.

While the replaceable type crank puller can be applied to cranks with differently sized crank axles by replacing the front socket thereof, the replaceable front socket tends to rotate along with the crank axle when being pressed against the crank axle, and is therefore easily worn out. That is, the replaceable front socket for the replaceable type crank puller has shorter service life compared to the fixed front socket for the fixed type crank puller, and fails to satisfy the consumers.

On the other hand, since the fixed type crank puller has front socket with fixed outer diameter, a user often has to prepare two crank pullers with differently sized front sockets for use with cranks having differently sized crank axles. In the event the crank axle is changed to another one with a different diametrical size at a later time, the user would have to purchase another crank puller corresponding to the new crank axle size. This would no doubt increase the user's purchasing cost.

From the above explanation, it is understood the conventional crank pullers, including both the fixed type and the replaceable type crank puller, have observable disadvantages in the practical application thereof and therefore require improvement.

SUMMARY OF THE INVENTION

A primary object of the present invention is to provide a crank puller facilitating dismounting of chainwheel. The crank puller includes a substantially T-shaped head portion, and a replaceable cap portion assembled to a front end of the head portion, so that the cap portion can be changed corresponding to a diametrical size of the crank axle, around which a crank is supported.

Another object of the present invention is to provide a crank puller facilitating dismounting of chainwheel, which includes a head portion fitted in a rearwardly opened hollow recess of a cap portion, such that the cap portion can be firmly held to the head portion for pressing against a crank axle without becoming easily separated from the head portion.

A further object of the present invention is provide a crank puller facilitating dismounting of chainwheel, which includes a bolt portion having a conical-bottomed hole formed in a front end thereof for holding a ball therein, so that a head portion can have a rear end fitted in the conical- bottomed hole to contact with the ball without directly contacting the bolt portion to cause wearing of the head portion and the bolt portion when they are rotating.

A still further object of the present invention is to provide a crank puller facilitating dismounting of chainwheel, which includes a bolt portion having a conical-bottomed hole formed in a front end thereof, and a head portion having a rear end fitted in the conical-bottomed hole. The head portion is provided with a neck section, around which a steel spring plate is clamped, such that the head portion is not in direct contact with an inner wall of the conical-bottomed hole to prevent wearing of the head portion when the same is rotating.

To achieve the above and other objects, the crank puller facilitating dismounting of chainwheel according to the present invention is designed for connecting to an internally threaded hole on a crank, which is used to drive a chainwheel to rotate, and pressing against a crank axle, around which the crank is supported, so as to separate the crank from the crank axle and enable subsequent dismounting of the chainwheel. The crank puller includes a nut portion, a bolt portion, a head portion, and a cap portion.

The nut portion has a front end externally provided with threads meshing with the internally threaded hole on the crank for connecting the nut portion to the crank via engagement of the external threads with the internally threaded hole; a hex rear end; a receiving space provided in the front end; and an internally threaded hollow bore axially extended from behind the receiving space to the hex rear end.

The bolt portion is provided on an outer surface with external threads for screwing into the threaded hollow bore of the nut portion, and includes a rear end and a front end formed into a conical-bottomed hole.

The head portion is a substantially T-shaped member having a diameter-expanded front end, a diameter-reduced neck section rearward extended from the front end, and a rear end located behind the neck section. The rear end is fitted in the conical-bottomed hole at the front end of the bolt portion.

The cap portion is used to press against the crank axle associated with the chainwheel, and defines a rearward opened hollow recess corresponding to the front end of the head portion for assembling thereto.

The bolt portion of the crank puller can be turned to forward press the cap portion against the crank axle while bring the nut portion to move rearward relative to the bolt portion, so that the nut portion brings the crank connected thereto to move outward and separate from the crank axle to enable subsequent dismounting of the chainwheel.

In a preferred embodiment of the present invention, the front end of the head portion is provided around a circumferential surface with an annular groove, in which an elastic element is fitted. Further, a steel spring plate is firmly clamped around the neck section.

In the rear end of the bolt portion, there is provided a recessed hexagonal socket, into which an Allen wrench can be fitted to drive the bolt portion to turn.

In the preferred embodiment of the present invention, a ball is disposed in the conical-bottomed hole at the front end of the bolt portion to prevent the rear end of the head portion fitted in the conical-bottomed hole from wearing. The cap portion is replaceable to correspond to different diametrical sizes of the crank axle.

To assemble the crank puller, first screw the bolt portion with the external threads into the internally threaded hollow bore of the nut portion until the bolt portion is exposed from the receiving space at the front end of the nut portion. Then, fit the elastic element in the annular groove around the front end of the head portion, and clamp the steel spring plate around the neck section of the head portion. Then, dispose the ball in the conical-bottomed hole at the front end of the bolt portion and assemble the head portion to the conical-bottomed hole with the rear end of the head portion getting in contact with the ball to minimize the wearing of the rear end of the head portion and the conical-bottomed hole caused by the turning of the bolt portion. After the head portion, the bolt portion and the nut portion are assembled to one another, fit the front end of the head portion into the hollow recess of the cap portion. In doing this, the elastic element fitted in the annular groove around the front end of the head portion is subjected to a force and compressed from an original position further into the annular groove. When the front end of the head portion has been fully fitted in the hollow recess of the cap portion, the elastic element restores to the original position to firmly press against an inner wall surface of the hollow recess and thereby firmly hold the cap portion to the front end of the head portion.

To use the crank puller of the present invention to separate the crank from the crank axle and facilitate the dismounting of the chainwheel, first screw the threads around the front end of the nut portion into the internally threaded hole on the crank, so that the nut portion and the crank are connected to each other via engagement of the threads with the threaded hole and the cap portion is in contact with the crank axle associated with the chainwheel. An operator can grip at the hex rear end of the nut portion with one hand, so that the nut portion is held in place. Then, engage the Allen wrench with the recessed hexagonal socket in the rear end of the bolt portion. Turn the Allen wrench in one direction for the bolt portion to screw forward in the threaded bore of the nut portion. At this point, since the cap portion assembled to the head portion at the front end of the bolt portion is forward pressed against the crank axle, the nut portion along with the crank connected thereto are brought by the turning bolt portion to move backward along a path defined by the engaged threads and threaded bore, so that the crank is finally separated from the crank axle and the chainwheel. The cap portion can be replaced according to a diametrical size of the crank axle.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

The present invention will now be described with a preferred embodiment thereof and with reference to the accompanying drawings.

Figure 1:
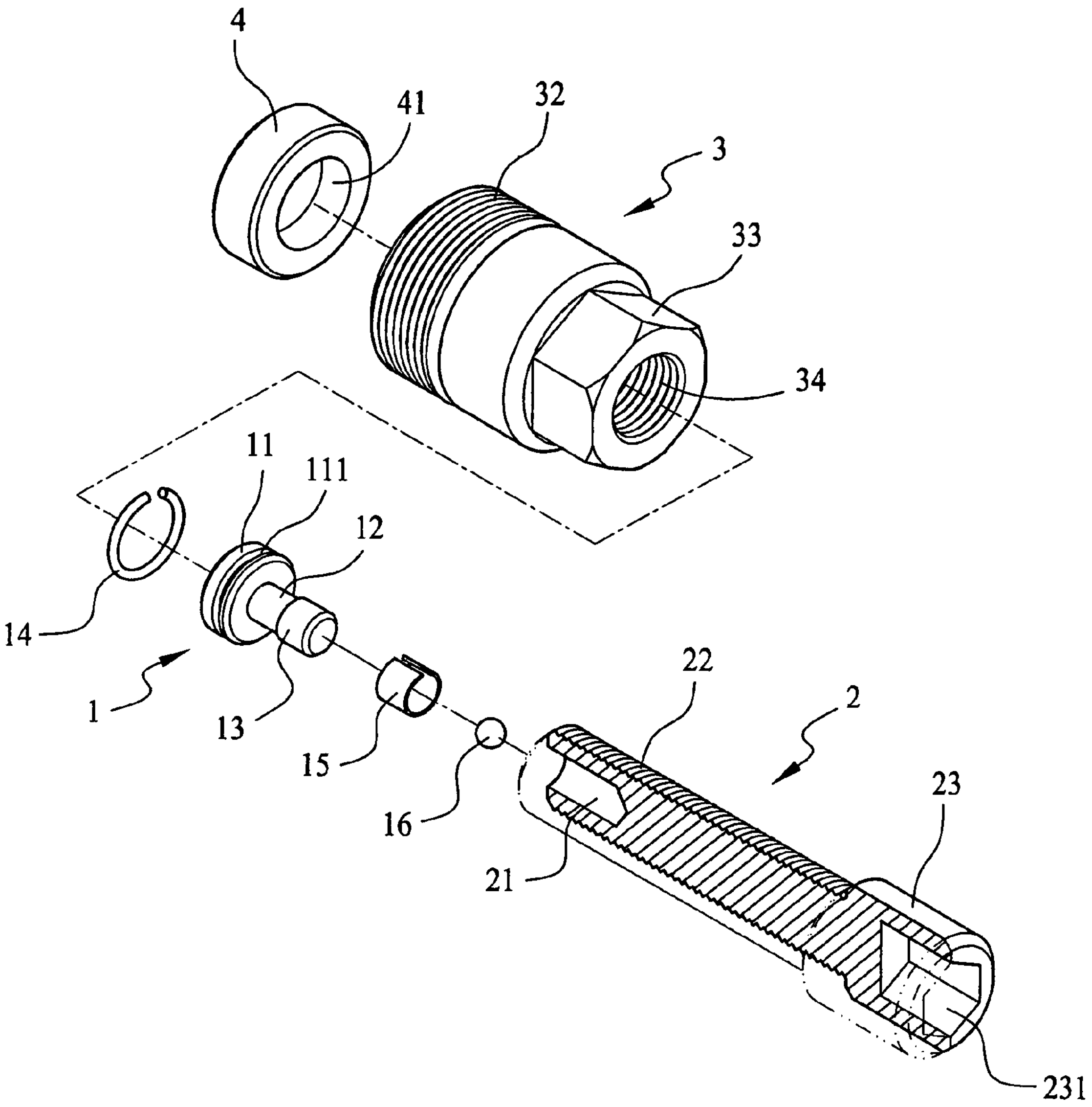
FIG. 1 is an exploded perspective view of a crank puller facilitating dismounting of chainwheel according to the present invention.
Figure 2:
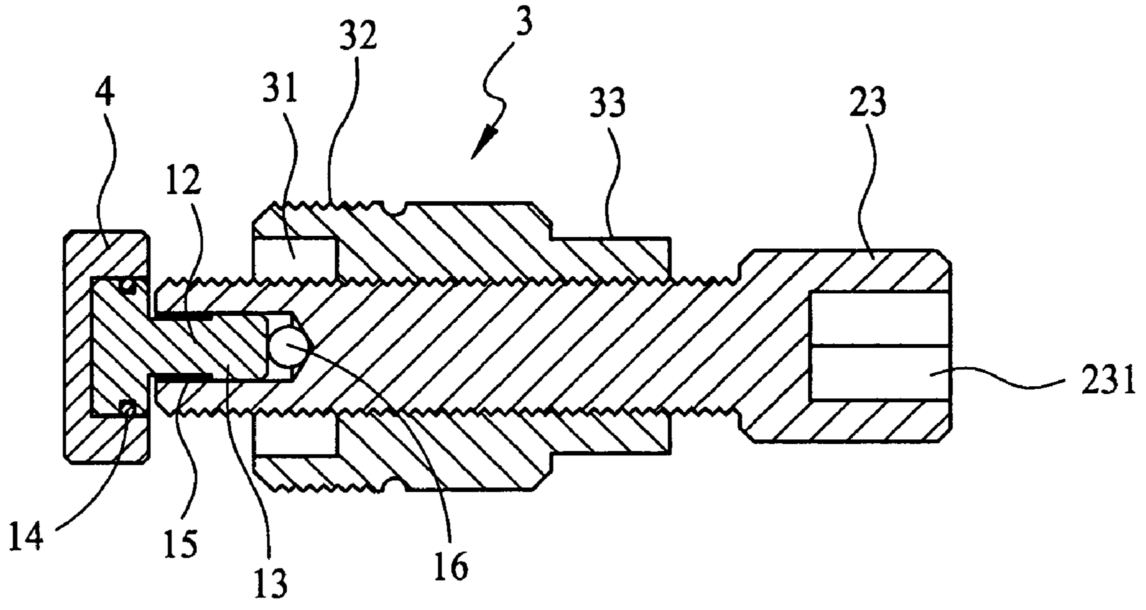
FIG. 2 is an assembled sectional view of the crank puller shown in FIG. 1.
Figure 3:
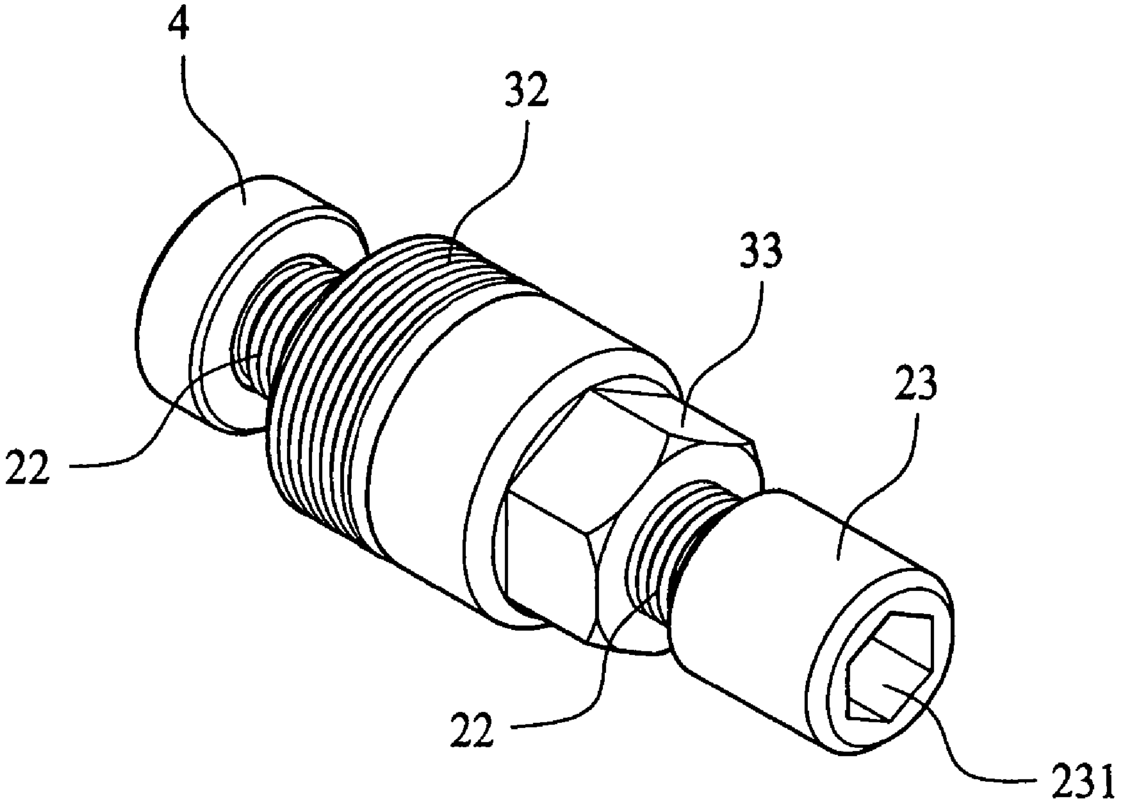
FIG. 3 is an assembled perspective view of the crank puller shown in FIG. 1.
Figure 4:
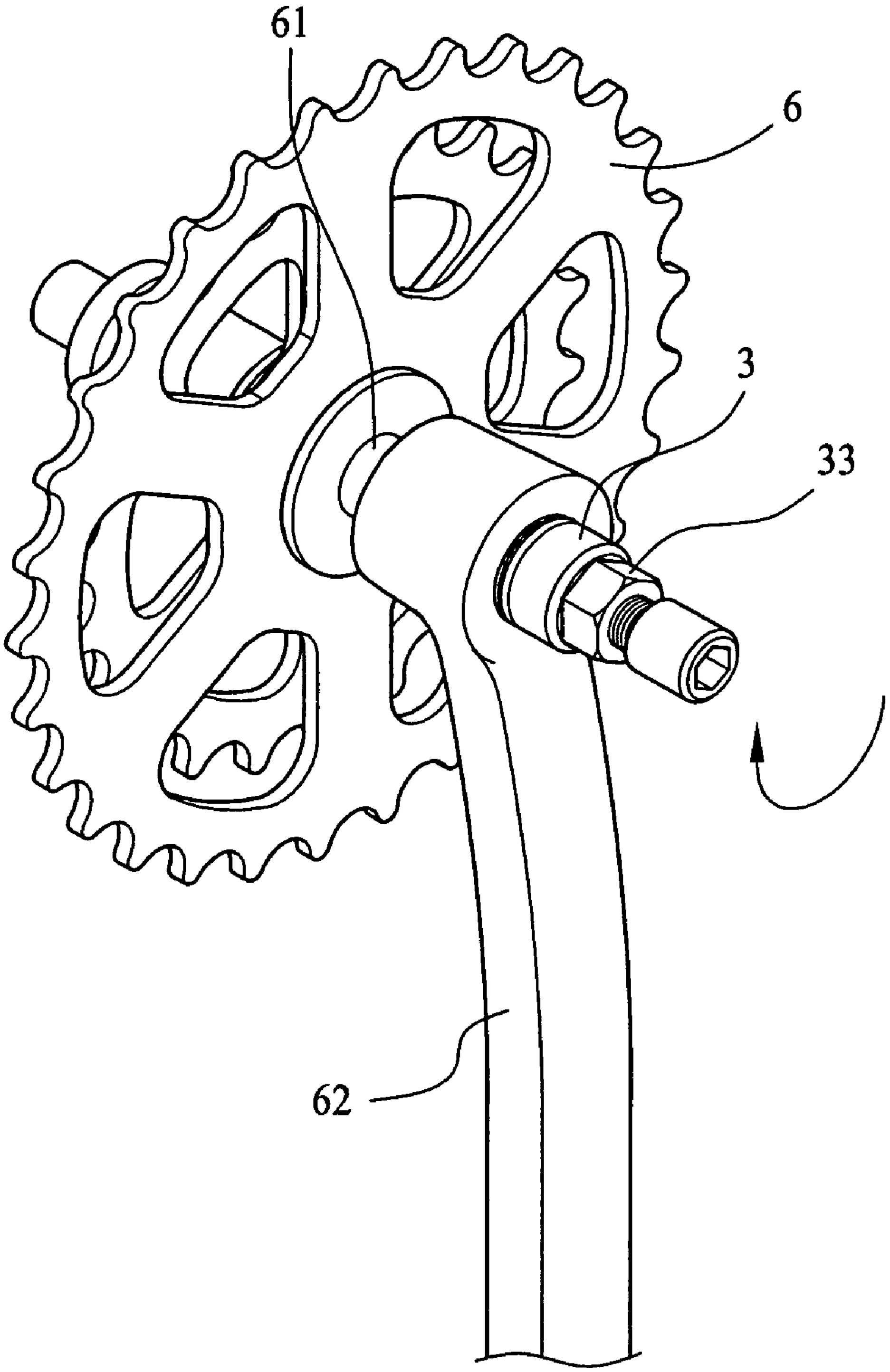
FIG. 4 is a perspective view showing the use of the crank puller of the present invention to separate a crank from a crank axle to enable dismounting of the chainwheel.
Figure 5:
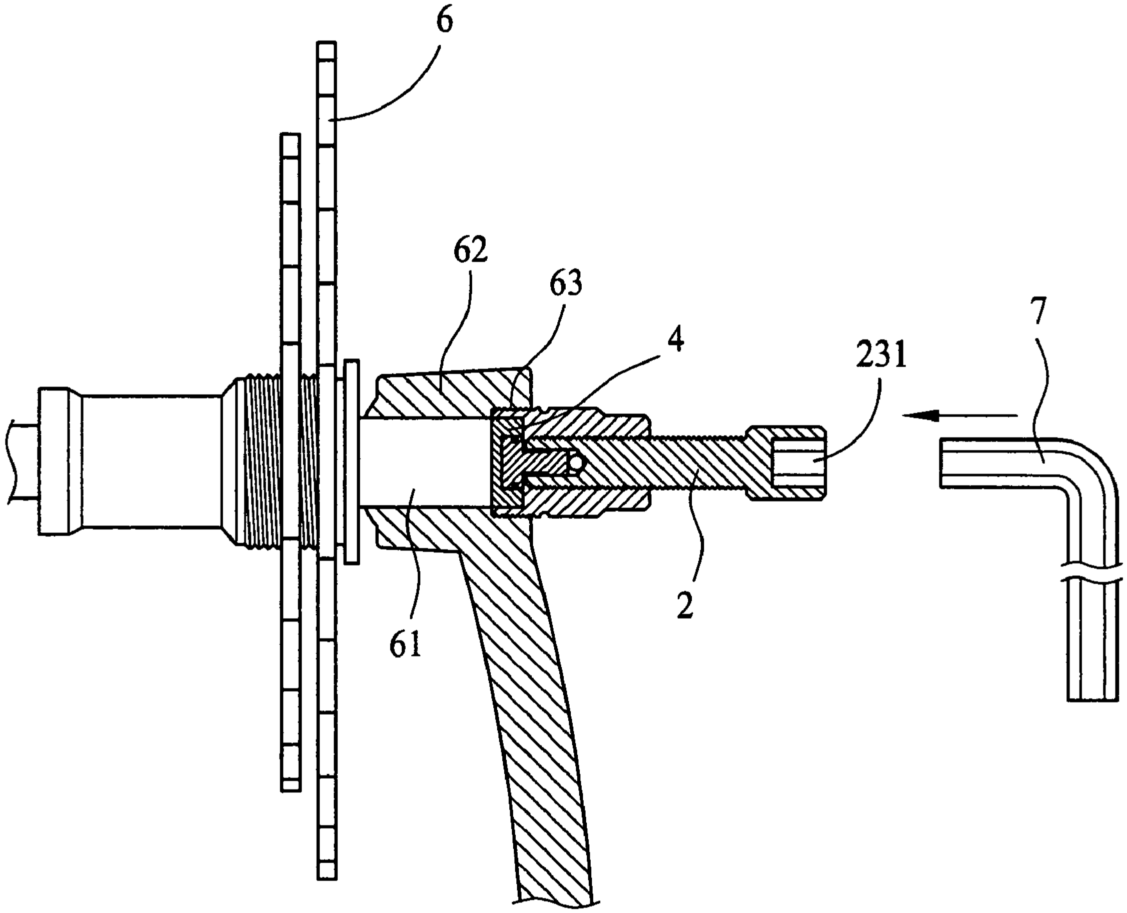
FIG. 5 is a sectioned side view showing the connection of the crank puller of the present invention to the crank.
Figure 6:
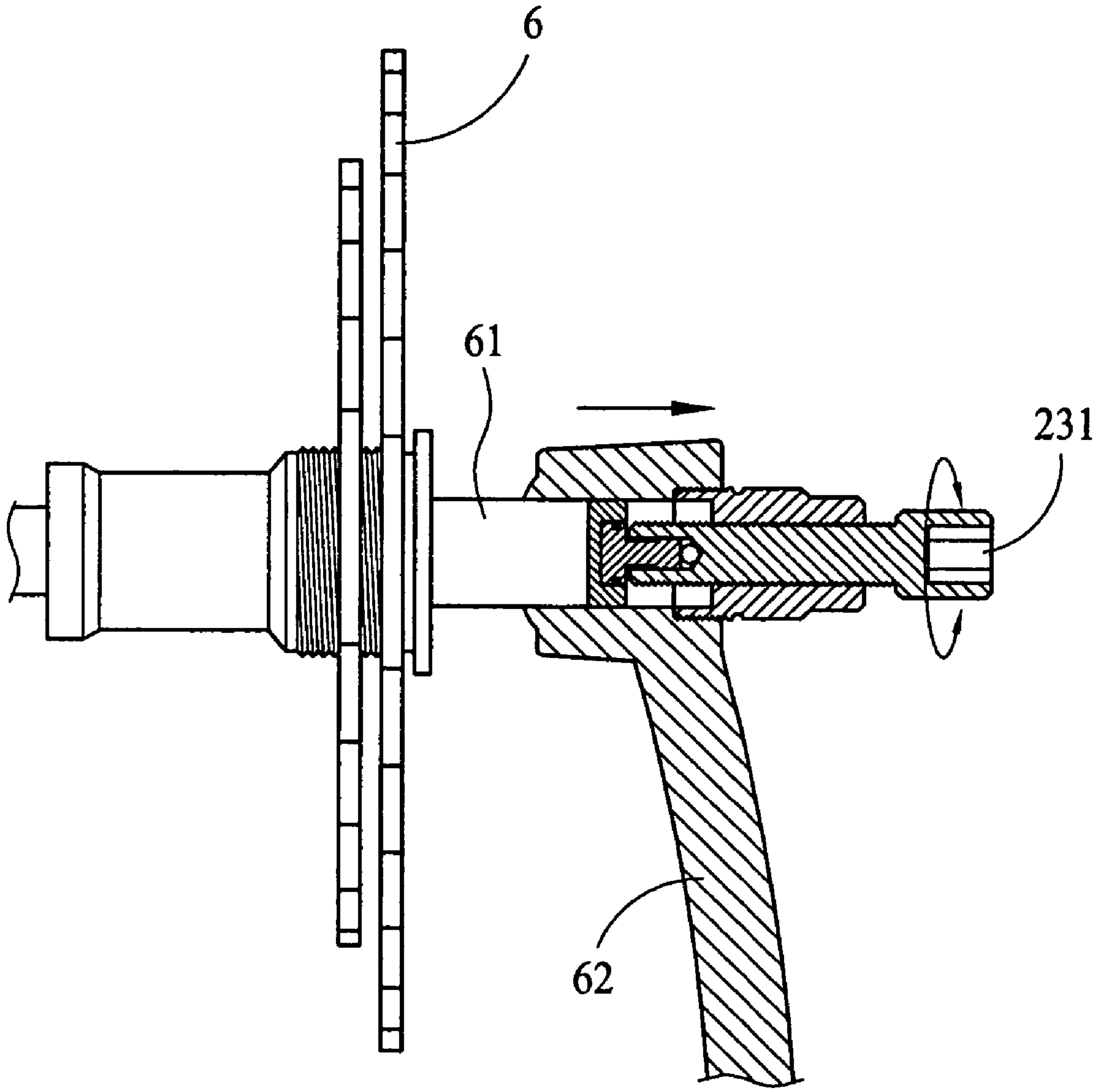
FIG. 6 is a sectioned side view showing the operation of the crank puller of the present invention to separate the crank from the crank axle.

Please refer to FIGS. 1, 2 and 3, in which a crank puller facilitating dismounting of chainwheel according to a preferred embodiment of the present invention is shown. As can be seen in FIGS. 4, 5 and 6, which will be described in more details later, the crank puller is designed for threading into an internally threaded hole 63 on a crank 62 to press against a crank axle 61 associated with a chainwheel 6, so as to enable separation of the crank 62 from the crank axle 61 to facilitate subsequent dismounting of the chainwheel. The crank puller according to the preferred embodiment of the present invention as shown in FIGS. 1 to 3 includes a nut portion 3, a bolt portion 2, a head portion 1, and a cap portion 4.

The nut portion 3 has a front end externally provided with threads 32 meshing with the internally threaded hole 63 on the crank 62 for connecting the nut portion 3 to the crank 62 via engagement of the external threads 32 with the internally threaded hole 63; a hex rear end 33; a receiving space 31 provided in the front end; and an internally threaded hollow bore 34 axially extended from behind the receiving space 31 to the hex rear end 33.

The bolt portion 2 is provided on an outer surface with external threads 22 for screwing into the internally threaded hollow bore 34 of the nut portion 3, and includes a rear end 23 and a front end formed into a conical-bottomed hole 21.

The head portion 1 is a substantially T-shaped member having a diameter-expanded front end 11, a diameter-reduced neck section 12 rearward extended from the front end 11, and a rear end 13 located behind the neck section 12. The rear end 13 is fitted in the conical-bottomed hole 21 at the front end of the bolt portion 2.

The cap portion 4 is used to press against the crank axle 61 associated with the chainwheel 6, and defines a rearward opened hollow recess 41 corresponding to the front end 11 of the head portion 1 for assembling thereto.

The bolt portion 2 of the crank puller can be turned to forward press the cap portion 4 against the crank axle 61 while bring the nut portion 3 to move rearward relative to the bolt portion 2, so that the nut portion 3 brings the crank 62 connected thereto to move outward and separate from the crank axle 61 to enable subsequent dismounting of the chainwheel 6.

In the present invention, the front end 11 of the head portion 1 is provided around a circumferential surface with an annular groove 111, in which an elastic element 14 is fitted. Further, a steel spring plate 15 is firmly clamped around the neck section 12.

In the rear end 23 of the bolt portion 2, there is provided a recessed hexagonal socket 231, into which an Allen wrench 7 can be fitted to drive the bolt portion 2 to turn.

In the preferred embodiment of the present invention, a ball 16 is disposed in the conical-bottomed hole 21 at the front end of the bolt portion 2 to prevent the rear end 13 of the head portion 1 fitted in the conical-bottomed hole 21 from wearing.

To assemble the crank puller, first screw the bolt portion 2 with the external threads 22 into the internally threaded hollow bore 34 of the nut portion 3 until the bolt portion 2 is exposed from the receiving space 31 at the front end of the nut portion 3. Then, fit the elastic element 14 in the annular groove 111 around the front end 11 of the head portion 1, and clamp the steel spring plate 15 around the neck section 12 of the head portion 1. Then, dispose the ball 16 in the conical-bottomed hole 21 at the front end of the bolt portion 2 and assemble the head portion 1 to the conical-bottomed hole 21 with the rear end 13 of the head portion 1 getting in contact with the ball 16, so as to minimize the wearing of the rear end 13 of the head portion 1 and the conical-bottomed hole 21 of the bolt portion 2 when they are turning. After the head portion 1, the bolt portion 2 and the nut portion 3 are assembled to one another, fit the front end 11 of the head portion 1 into the hollow recess 41 of the cap portion 4. In doing this, the elastic element 14 fitted in the annular groove 111 around the front end 11 of the head portion 1 is subjected to a force and compressed from an original position further into the annular groove 111. When the front end 11 of the head portion 1 has been fully fitted in the hollow recess 41 of the cap portion 4, the elastic element 14 restores to the original position to firmly press against an inner wall surface of the hollow recess 41 and thereby hold the cap portion 4 to the front end 11 of the head portion 1.

Please refer to FIG. 4. To use the crank puller of the present invention to facilitate the dismounting of the chainwheel 6, first screw the external threads 32 around the front end of the nut portion 3 into the internally threaded hole 63 on the crank 62, so that the nut portion 3 and the crank 62 are connected to each other via engagement of the external threads 32 with the threaded hole 63 and the cap portion 4 is in contact with the crank axle 61 associated with the chainwheel 6. Please refer to FIG. 5. An operator (not shown) can grip at the hex rear end 33 of the nut portion 3 with one hand, so that the nut portion 3 is held in place. Then, engage the Allen wrench 7 with the recessed hexagonal socket 231 in the rear end 23 of the bolt portion 2. Please refer to FIG. 6. Turn the Allen wrench 7 in one direction for the bolt portion 2 to screw forward in the threaded bore 34 of the nut portion 3. At this point, since the cap portion 4 assembled to the head portion 1 at the front end of the bolt portion 2 is forward pressed against the crank axle 61, the nut portion 3 along with the crank 62 connected thereto are brought by the turning bolt portion 2 to move backward along a path defined by the engaged threads 22 and threaded bore 34, so that the crank 62 is finally separated from the crank axle 61 and the chainwheel 6, enabling the chainwheel 6 to be dismounted from a bicycle (not shown).

According to the present invention, the cap portion 4 is replaceable to correspond to different diametrical sizes of the crank axle 61.

Moreover, the ball 16 disposed in the conical-bottomed hole 21 is in point contact with the latter. When the cap portion 4 is pressed against the crank axle 61, the head portion 1 will be brought to rotate at the same time. With the steel spring plate 15 clamped around the neck section 12 of the head portion 1 and the ball 16 located behind the rear end 13 of the head portion 1, it is able to prevent the head portion 1 from directly contacting with the conical-bottomed hole 21. Therefore, the wearing of the portions of the crank puller in rotating can be reduced to achieve the object of protecting the heat portion 1 against easy wearing.

In the present invention, when the head portion 1 is fitted into the hollow recess 41 of the cap portion 4, the elastic element 14 in the annular groove 111 at the front end 11 of the head portion 1 is first compressed further into the annular groove 111 and will then restore to an original position to elastically press against the inner wall surface of the hollow recess 41, so that the cap portion 4 is firmly assembled to the front end of the head portion 1 without easily becoming separated therefrom when the cap portion 4 is pressed against the crank axle 61. Moreover, since the cap portion 4 is replaceable to correspond to an actual diametrical size of the crank axle 61, the crank puller is applicable to crank axles of different diametrical sizes.

The present invention has been described with a preferred embodiment thereof and it is understood that many changes and modifications in the described embodiment can be carried out without departing from the scope and the spirit of the invention that is intended to be limited only by the appended claims.

What is claimed is:

1. A crank puller for threading into an internally threaded hole on a crank to press against a crank axle associated with a chainwheel and enabling separation of the crank from the crank axle to facilitate subsequent dismounting of the chainwheel, comprising:

- a nut portion having
  - a front end externally provided with threads meshing with the internally threaded hole on the crank for connecting the nut portion to the crank via engagement of the external threads with the internally threaded hole, a receiving space being provided in said front end, and
  - a hex rear end having an internally threaded hollow bore axially extended from behind the receiving space into the hex rear end;
- a bolt portion provided on an outer surface with external threads for screwing into the internally threaded hollow bore of the nut portion, and including a rear end and a front end formed into a conical-bottomed hole;
- a head portion being a substantially T-shaped member having a diameter-expanded front end, a diameter-reduced neck section rearward extended from the front end, and a rear end located behind the neck section, the rear end being fitted in the conical-bottomed hole at the front end of the bolt portion; and
- a cap portion for press against the crank axle, and defining a rearward opened hollow recess corresponding to the front end of the head portion for assembling thereto;
- wherein, the bolt portion is turnable to forward press the cap portion against the crank axle while bringing the nut portion to move rearward relative to the bolt portion, so that the nut portion brings the crank connected thereto to move outward and separate from the crank axle to enable subsequent dismounting of the chainwheel.

2. The crank puller as claimed in claim 1, wherein the front end of the head portion is externally provided with an annular groove, and further comprising an elastic element fitted in the annular groove.

3. The crank puller as claimed in claim 1, further comprising a steel spring plate clamped around the neck section of the head portion.

4. The crank puller as claimed in claim 1, wherein the rear end of the bolt portion is internally provided a recessed hexagonal socket, into which an Allen wrench can be fitted to drive the bolt portion to turn.

5. The crank puller as claimed in claim 1, further comprising a ball disposed in the conical-bottomed hole of the bolt portion to locate behind the rear end of the head portion, so as to avoid wearing of the head portion and the bolt portion.

6. The crank puller as claimed in claim 1, wherein the cap portion has a size corresponding to a diametrical size of the crank axle.

* * * * *